July 31, 1962  J. M. CANAVAN  3,047,239

NOZZLE CONSTRUCTION

Filed Feb. 15, 1960

INVENTOR.
JOSEPH M. CANAVAN
BY Buckhorn, Cheatham & Blore
ATTORNEYS

United States Patent Office 3,047,239
Patented July 31, 1962

3,047,239
NOZZLE CONSTRUCTION
Joseph M. Canavan, 370 Newport Ave., Hermiston, Oreg.
Filed Feb. 15, 1960, Ser. No. 8,857
6 Claims. (Cl. 239—579)

This invention relates to nozzles and particularly to a shower nozzle equipped with a valve to control the flow of fluid.

It is common practice to provide a hand-operated valve on a shower nozzle by which the occupant of a shower stall can turn the shower off or on. However, after the shower is turned on, the occupant must look up at the shower head to locate the valve and normally the occupant will turn the shower head to one side, and then operate the valve in order to avoid being struck in the face by the shower spray.

It is a main object of the present invention to provide a nozzle which is operable automatically to close off the flow of water when the head is turned to one side.

Another important object of the invention is to provide a shower nozzle in which the nozzle can be turned from a position in alignment with the base member to various other positions with the shower on to give the usual versatility of the shower nozzle, and yet which is operable automatically to close off the flow of water when the nozzle head is turned to a predetermined position of misalignment.

Various other objects of the invention will be apparent from the following description taken in connection with the accompanying drawings wherein.

Figure 1:
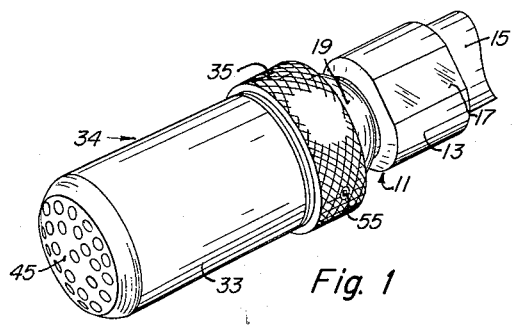
FIG. 1 is a perspective view of a nozzle incorporating the concepts of the present invention.
Figure 4:
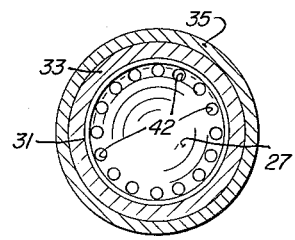
FIG. 4 is a vertical section taken along line 4—4 of FIG. 2, with the base member and the ball valve element removed.
Figure 2:
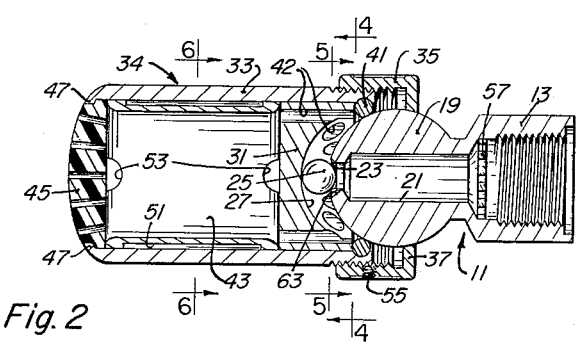
FIG. 2 is a longitudinal sectional view through the nozzle, showing the nozzle in its open condition.
Figure 5:
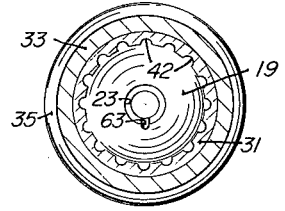
FIG. 5 is a vertical section taken along line 5—5 of FIG. 2.
Figure 3:
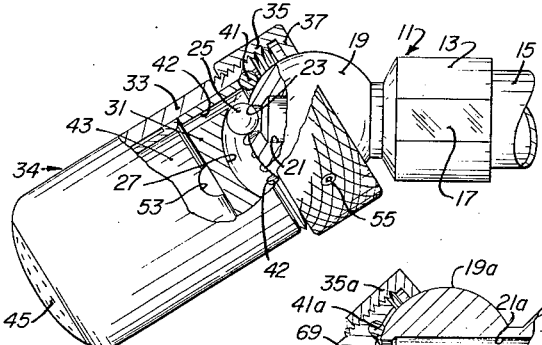
FIG. 3 is a view in side elevation of the nozzle, parts being broken away, and the nozzle being shown in its closed condition.
Figure 6:
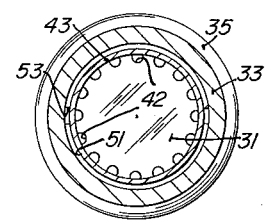
FIG. 6 is a vertical section taken along line 6—6 of FIG. 2.

Referring to FIGS. 1, 2 and 3, the nozzle comprises a base member 11 having an internally threaded rear portion 13 of tubular configuration which is mounted on a supply pipe 15. Wrench flats 17 preferably are formed on the external surface of the tubular portion 13. The base member is formed with spherical front portion having a through axial passage 21 terminating in an axial outlet defined by a valve seat 23.

A ball 25 of a diameter larger than that of the seat 23 fits loosely between the seat and a concave cam surface 27 as the parts are shown in FIG. 2, but is cammed against the seat when the parts are in the position shown in FIG. 3 to close off the flow of water through the nozzle. Further mention of how and why this occurs will be made hereinafter.

The wall of the seat 23 diverges outwardly and forwardly of the base member so that the ball 25 projects into the frusto-conical space defined by the seat. This permits the ball to be separated or spaced from the seat a considerable extent and yet be confined against unlimited lateral movement by the wall of the seat. This maintains the ball in a centered relation relative to the flow passage 21 despite movement of the cam surface 27.

The ball 25 is relatively rigid, and may be formed of steel or even a plastic material, such as nylon. The cam surface 27 is formed on a disc-shaped insert 31 fitting in a tubular nozzle housing 33 of the nozzle head generally entitled 34. The housing is mounted on the spherical portion 19 by means of a nut 35 which threads on the base end of the housing and has a radially-inwardly-extending flange 37 defining an opening of smaller diameter than that of the spherical portion but larger than that of the tubular portion 13 of the base member. This means the nut may be passed over the tubular portion 13 to engage the flange with the spherical portion 19. The inner margin of the radial flange is preferably curved to conform to the curvature of the spherical portion.

An O-ring 41 fits between the base end of the housing 33 and the spherical portion 19 to form a fluid seal therebetween. The O-ring has an internal diameter approximately that of the opening in the flange 37 of the nut 35 and is retained in place by the rear end of the insert 31.

The insert is formed with a plurality of longitudinal flow passages 42 which are circumferentially located thereabout and provide for the forward flow of fluid when the valve is open. A sleeve-like spacer 43 slidably fits in the housing 33 between the insert 31 and a perforated spray disc 45 which has a rabbeted peripheral margin to fit against a flange 47 formed on the forward end of the housing 33. The disc is preferably formed of a plastic material so that the minerals in the water will not tend to clog the openings through the disc.

The spacer 43 is externally recessed at 51 between its ends, and slots 53 are formed at the ends to allow drainage from the recess. The recess makes it easier to remove the sleeve when desired.

At assembly of the parts, the nut 35 is threaded on the housing 33 an extent to eliminate end play between the spacer 43 and the perforated disc 45 and the insert 31, and to slightly compress the O-ring 41. Then a setscrew 55 in the nut is threaded inwardly to hold the nut against rotation relative to the housing.

A strainer disc 57 is provided in the tubular portion 13 of the base member to strain out any solid particles in the water to prevent them from clogging the valve.

As is apparent from FIG. 2, the cam surface 27 has a different center of curvature than the surface of the head 19, and the radius of the surface 27 is such that the space between the cam surface 27 and the forward end of the spherical portion 19 is greater at the center of the cam surface than at the margins of such surface. This space is so designed in relation to the ball diameter, that when the nozzle housing 33 is turned to a position in alignment with the base member, the ball is free between the cam surface and the valve seat and flow is permitted. Misalignment between the nozzle housing and the base member is also permitted without closing the valve, but when the nozzle housing is turned to the FIG. 3 position of the parts, the ball is cammed firmly against the seat 23 to close off the flow of water through the valve. This means that when the occupant of a shower stall turns the nozzle to one side, such as he might do to soap down or when he is about to leave the shower stall, the water will be cut off automatically. This results in considerable saving.

The seat 23 has a groove 63 formed therein to allow a slow drip when the nozzle housing is in the FIG. 3 position. This drip may be, for example, in the order of one gallon per six minutes at 60 pounds water pressure. This drip serves to regulate the temperature of the water so that when the housing is turned to a position in alignment with the base member, the first water discharged from the shower head will be warm rather than cold. If it were not for the groove, the warm water at the base member would cool off and the first water discharged from the head would be cold.

Figure 7:
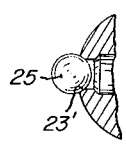
FIG. 7 is a fragmentary sectional view of a modified form of the invention.

In the FIG. 7 form of the invention, there is no groove 63 and the ball 25 seats tightly against the seat 23'. This form of the invention may be used when it is not desired to regulate the temperature, or when it is unnecessary, such as when the nozzle construction is used for other purposes than in a shower.

Figure 8:
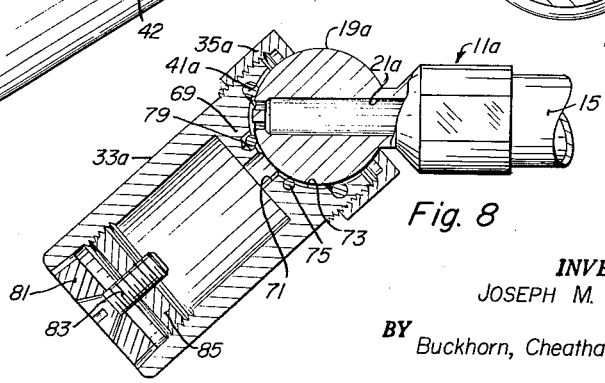
FIG. 8 is a longitudinal sectional view through a modified form of the invention, showing the nozzle in a closed condition.

FIG. 8 shows another modified form of the invention including a base member 11a, a spherical portion 19a, a nozzle housing 33a and a nut 35a. The housing 33a has an internally-extending flange 69 defining a flow passage 71. The flange is formed with a socket 73 of a configuration complementary to that of the spherical portion 19a. The flange is also formed with an annular groove to receive an elastomer O-ring 75 which bears against the spherical surface 19a around the flow passage 21a. The O-ring 75 has a diameter larger than that of the passage 71 but smaller than that of the O-ring 41a. When the nozzle housing is turned to one side, the outlet openings 77 in the spherical portion 19a are disposed between the O-rings and hence the flow of water is cut off. A recess 79 may be formed in the groove for the O-ring 75 to provide for temperature regulation of the type provided by the groove 63 in the first form of the invention.

At the front end of the housing 33, a marginally grooved disc 81 fits in a tapered front end portion of the nozzle housing, and a screw 83 threads into a disc 85 which threads into the front end of the housing.

Having described the invention in what is considered to be the preferred embodiment thereof, it is desired that it be understood that the invention is not to be limited other than by the provisions of the following claims.

I claim:

1. A nozzle construction comprising a base member for connection to a supply of fluid, a nozzle member mounted on said base member for predetermined pivotal movement, a valve for closing off flow of fluid through the nozzle construction, said valve including an outlet opening formed in said base member, a loose valve member next to said opening, means for retaining said loose valve member next to said opening during pivotal movement of said nozzle member relative to said base member, said means being on said nozzle member and being carried by said nozzle member as a consequence of the pivotal movement of said nozzle member into engagement with the surface of said valve member remote from said outlet opening for pressing said valve member against the edges of said opening in at least one pivoted position of said nozzle member to close said valve, but releasing said loose valve member in at least one other pivoted position of said nozzle member to open said valve.

2. A nozzle construction comprising a base member for connection to a supply of fluid, a nozzle member mounted on said base member for predetermined pivotal movement, a valve for closing off flow of fluid through the nozzle construction, said valve including an outlet opening formed in said base member, a loose valve member separate from said nozzle member and said base member and disposed next to said opening, means for retaining said loose valve member next to said opening during pivotal movement of said nozzle member relative to said base member, said means being on said nozzle member and being carried by said nozzle member as a consequence of the pivotal movement of said nozzle member into engagement with the surface of said valve member remote from said outlet opening for pressing said valve member against the edges of said opening in certain pivoted positions of said nozzle member to close said valve but releasing said loose valve member in the position of said nozzle member when it is in alignment with said base member to open said valve.

3. A nozzle construction comprising a base member having a ball formed on one end and a flow passage formed therethrough opening through the wall of said ball at said end to provide an outlet opening, a nozzle member pivotally mounted on said ball for movement to a number of different positions, a free valve member next to said opening, said flow passage flaring outwardly at said opening to provide flared wall portions, means on said nozzle member for retaining said valve member in a position in which at least a portion of said valve member projects into the flared opening, said means being carried as a consequence of the pivotal movement of said nozzle member into a position in engagement with the surface of said valve member remote from said flared wall portions to press said valve member against said flared wall portions to close off flow of fluid through said base member, when said nozzle member is pivoted to at least one position relative to said base member and for releasing said valve member in at least one position of said nozzle member relative to said base member.

4. A nozzle construction comprising a base member having a ball formed on one end and a flow passage formed therethrough opening through the wall of said ball at said end to provide an outlet opening, a nozzle member pivotally mounted on said ball for movement to a number of different positions, a free valve member separate from said nozzle member and said base member and disposed next to said opening, said nozzle member having a curved surface which is adjacent said end of said ball member and which is nonconcentric relative to said ball member for pressing said valve member against the edges of the outlet opening to close off flow through said base member, said curved surface releasing said valve member in another position of said nozzle member relative to said base member.

5. A nozzle construction comprising a base member having a ball formed on one end and a flow passage formed therethrough opening through the wall of said ball at said end to provide an outlet opening, a nozzle member pivotally mounted on said ball for movement to a number of different positions, a free valve member in the form of a ball next to said opening, said nozzle member having a curved surface which is adjacent said end of said ball member and which is nonconcentric relative to said ball member for pressing said valve member against the edges of the outlet opening to close off flow through said base member, said curved surface releasing said valve member in another position of said nozzle member relative to said base member, said curved surface providing a curved space between said curved surface and said ball of maximum thickness at said opening and of lesser thickness radially away from said opening.

6. A device of the class described comprising a first member and a second member, a passageway through said members to conduct fluid therethrough, a valve seat around said passage and carried by one of said members, said members being formed to provide spaced, opposed, rigid walls defining a cavity, said cavity being part of said passageway, a valve member in said cavity next to said seat and being separate from said members, said valve member being smaller than said cavity, and means connecting said first and second members for relative pivotal movement about an axis normal to the length of said passage to change the shape of said cavity as a consequence of such pivotal movement and cause relative approaching movement of said walls at the location of said valve member in a direction normal to the plane of said seat to cause seating of said valve member, pivotal movement the opposite way causing relative separating movement of said walls in said direction at the location of said valve member to permit unseating of said valve member.

References Cited in the file of this patent

UNITED STATES PATENTS

| | | |
|---|---|---|
| 1,218,879 | Luzzi | Mar. 13, 1917 |
| 1,842,894 | Breegle | Jan. 26, 1932 |
| 2,406,941 | Brooks | Sept. 3, 1946 |

FOREIGN PATENTS

| | | |
|---|---|---|
| 192,084 | Great Britain | Jan. 24, 1924 |
| 545,748 | Canada | Sept. 3, 1957 |
| 701,709 | France | Jan. 13, 1931 |
| 769,900 | France | June 18, 1934 |
| 953,106 | France | May 16, 1949 |
| 1,066,670 | France | Jan. 20, 1954 |